（12）United States Patent
Sugita et al.

(10) Patent No.: US 8,560,682 B2
(45) Date of Patent: Oct. 15, 2013

(54) DISTRIBUTION MONITORING SYSTEM, DISTRIBUTION MONITORING METHOD, AND PROGRAM

(75) Inventors: Takahide Sugita, Tokyo (JP); Saverio Niccolini, Heidelberg (DE); Felipe Huici, Heidelberg (DE); Jan Seedorf, Heidelberg (DE)

(73) Assignee: NEC Corporation, Tokyo (JP)

( * ) Notice: Subject to any disclaimer, the term of this patent is extended or adjusted under 35 U.S.C. 154(b) by 242 days.

(21) Appl. No.: 13/148,527

(22) PCT Filed: Feb. 15, 2010

(86) PCT No.: PCT/JP2010/052181
§ 371 (c)(1),
(2), (4) Date: Aug. 9, 2011

(87) PCT Pub. No.: WO2010/095588
PCT Pub. Date: Aug. 26, 2010

(65) Prior Publication Data
US 2011/0314146 A1    Dec. 22, 2011

(30) Foreign Application Priority Data

Feb. 18, 2009  (JP) .................................. 2009-035942
Sep. 1, 2009  (JP) .................................. 2009-201300

(51) Int. Cl.
*G06F 15/173*        (2006.01)

(52) U.S. Cl.
USPC ........................................................ 709/224

(58) Field of Classification Search
USPC ........................................................ 709/224
See application file for complete search history.

(56) References Cited

U.S. PATENT DOCUMENTS 7,313,565 B2 * 12/2007 Zhang et al. ........................... 1/1
8,248,919 B2 *  8/2012 Shi et al. ........................ 370/218
8,429,444 B2 *  4/2013 Rancurel et al. ............... 714/4.1

FOREIGN PATENT DOCUMENTS

| JP | 2003158549 A | 5/2003 |
| JP | 2007013590 A | 1/2007 |
| JP | 2008193221 A | 8/2008 |
| JP | 2008217135 A | 9/2008 |
| JP | 2008259047 A | 10/2008 |

OTHER PUBLICATIONS

Lee et al., A Study on Structure for Monitoring and Detecting VoIP Abnormal Traffic, p. 178-182, 2008, IEEE.*

(Continued)

*Primary Examiner* — Larry Donaghue

(57) ABSTRACT

A network distribution monitoring method is executed by a computer which configures each of a plurality of nodes, in a network which comprises the plurality of nodes which are connected with a management network. The network distribution monitoring method includes: generating a first detection message by detecting a first traffic on an object network of a corresponding one of a plurality of first predetermined applications, in each of first probe nodes of the plurality of nodes; transmitting the first detection message to a node determined from a first hash value to only a first function identifier showing a kind of the corresponding one or the first function identifier and address data of the first traffic; generating a first mediation processing result by performing first mediation processing on the first detection message to the plurality of first applications, in a first mediation node of the plurality of nodes; and storing a result of the first mediation processing in a first collector node of the plurality of nodes. In this way, the distribution monitoring system is provided in which it is possible to monitor the advanced function.

42 Claims, 15 Drawing Sheets

(56) References Cited

OTHER PUBLICATIONS

Di Pietro et al., Crosstalk: A Scalable Cross-Protocol Monitoring System for Anomaly Detection p. 1-6, May 2010.*
Barry et al., A HyBrid Stateful and Cross-Protacal Intrusion Detection System for Converged Applications pp. 1616-1633.*
Rowstron et al., Pastry: Scalable, decentralized object location and routing for large-scale peer-to-peer systems, pp. 1-22, Nov. 2001.*
International Search Report for PCT/JP2010/052181 mailed May 11, 2010.

M. Cai et al., "WormShield: Fast Worm Signature Generation with Distributed Fingerprint Aggregation", IEEE Transactions on Dependable and Secure Computing, vol. 4, No. 2, 2007, pp. 88-104.
M. Cai et al., "Distributed Aggregation Algorithms with Load-Balancing for Scalable Grid Resource Monitoring", Parallel and Distributed Processing Symposium 2007, IEEE, 2007.
P. Yalagandula et al., "A Scalable Distributed Information Management System", ACM SIGCOMM Computer Communication Review, vol. 34, Issue 4, Oct. 2004, pp. 379-390.

* cited by examiner

Fig. 4

| No. | PROTOCOL | TRANSMISSION SOURCE IP | TRANSMISSION DESTINATION IP | TRANSMISSION SOURCE SIP-URI | TRANSMISSION DESTINATION SIP-URI | SIP METHOD | COUNT | COUNTED TIME [SEC.] |
|---|---|---|---|---|---|---|---|---|
| ... | ... | ... | ... | ... | ... | ... | ... | ... |
| 10 | SIP | 192.168.0.1 | 192.168.0.11 | sender@sip.com | receiver1@sip.com | INVITE | 1 | 1 |
| ... | ... | ... | ... | ... | ... | ... | ... | ... |

Fig. 5

| No. | FUNCTION NAME | FUNCTION ID | ARGUMENT OF HASH FUNCTION | MEDIATION TYPE |
|---|---|---|---|---|
| ... | ... | ... | ... | ... |
| 7 | VoIP MONIOTING | 7 | FUNCTION ID | CORRELATION OF SIP AND RTP (IP ADDRESS, PORT NO.) |
| 8 | IPTV MONITORING | 8 | FUNCTION IF, SOURCE IP | CORRELATION OF SIP AND RTP (IP ADDRESS, PORT NO.) |
| ... | ... | ... | ... | ... |

Fig. 6

| ID | IP ADDRESS |
|---|---|
| ... | ... |
| 22 | 196.168.0.22 |
| ... | ... |

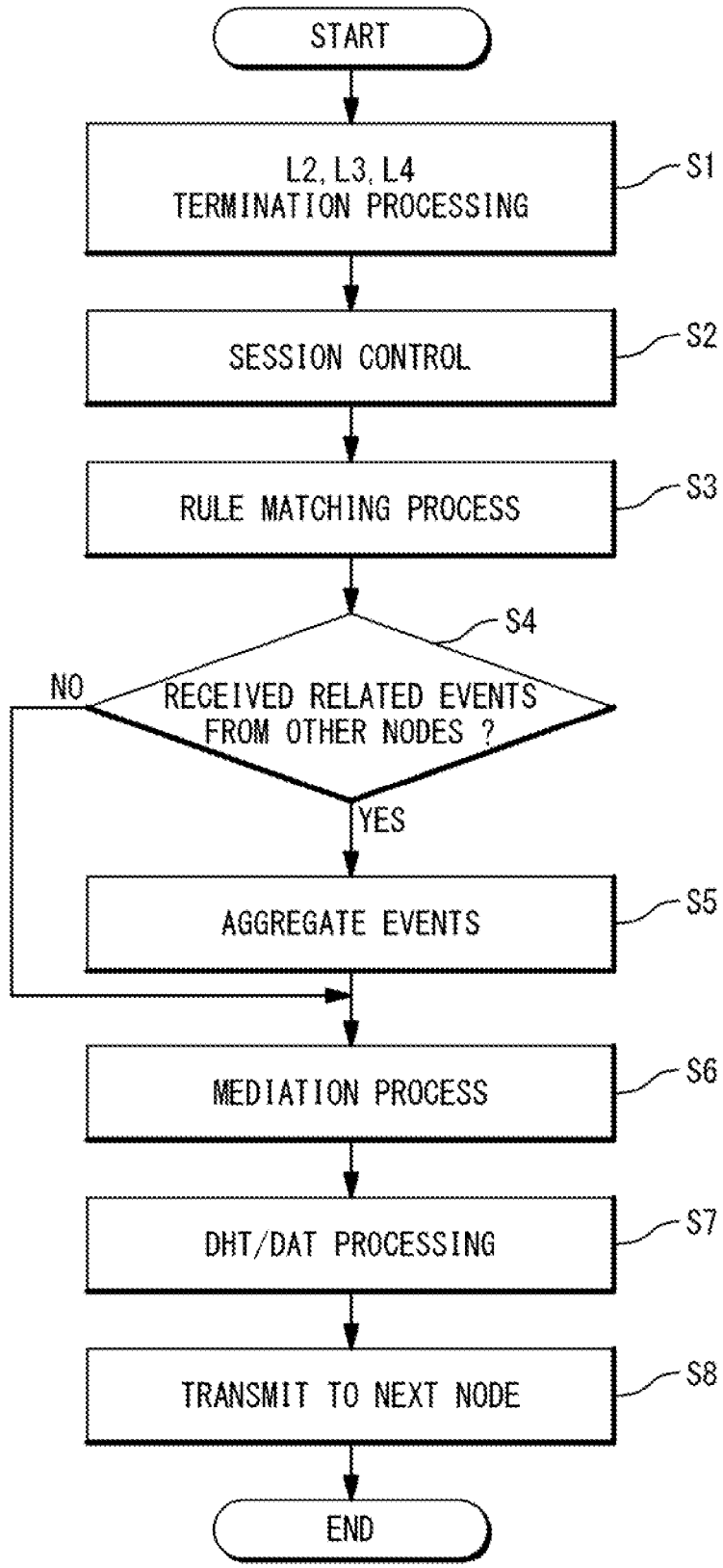

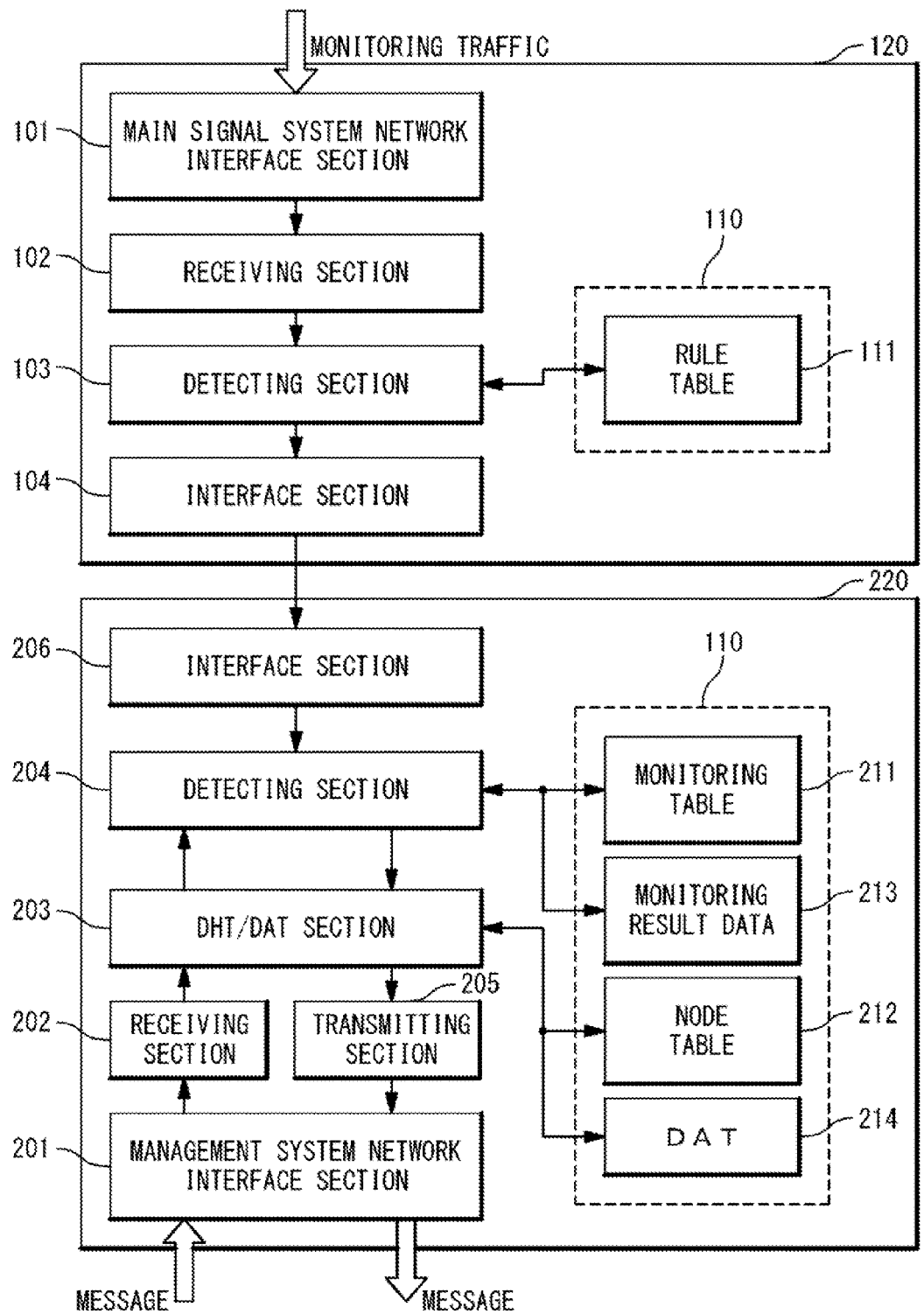

Fig. 12

| EVENT KIND | LOWER NODE ID | EVENT COUNT | FIRST EVENT TIME | LAST EVENT TIME |
|---|---|---|---|---|
| Warm A | 50, 40 | 100 | YYYY/MM/DD HH:MM | YYYY/MM/DD HH:MM |
| Warm C | 30 | 300 | YYYY/MM/DD HH:MM | YYYY/MM/DD HH:MM |
| ... | ... | ... | ... | ... |

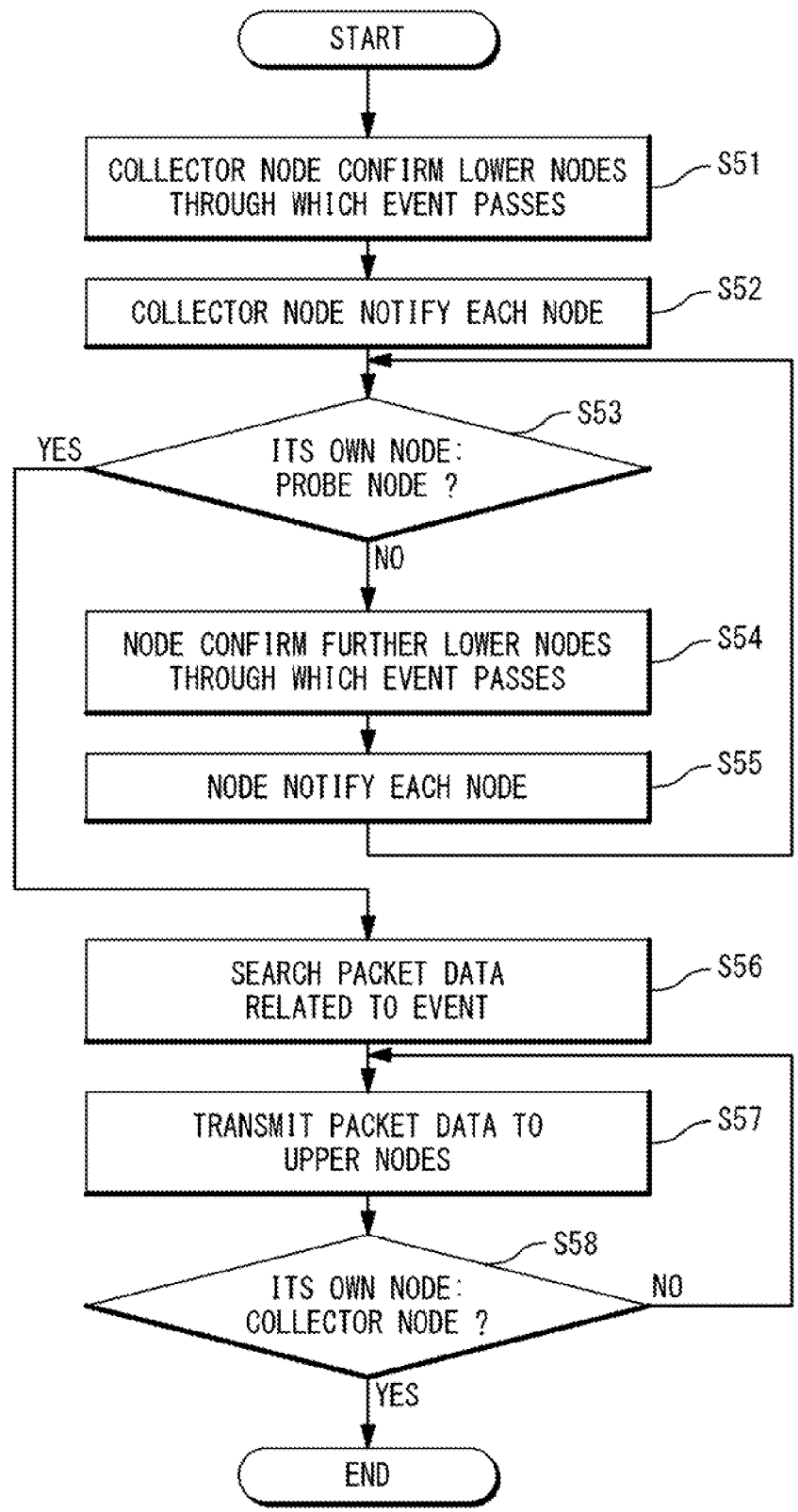

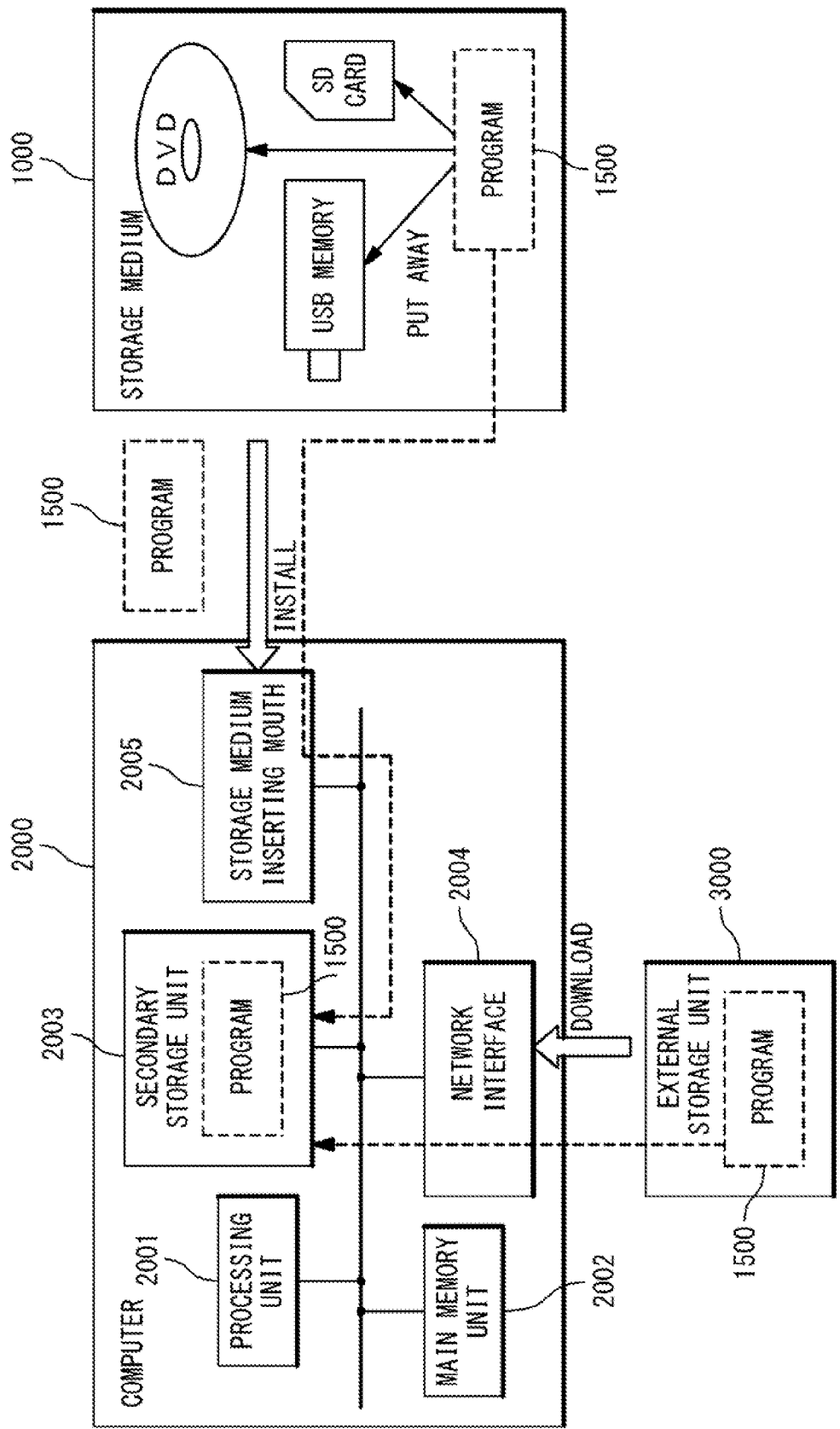

DISTRIBUTION MONITORING SYSTEM, DISTRIBUTION MONITORING METHOD, AND PROGRAM

TECHNICAL FIELD

The present invention is related to a distribution monitoring system, a distribution monitoring method and a program.

BACKGROUND ARTS

As a traffic quantity and a communication band increase, the monitoring of a large-scale network becomes not easy. When grasping the whole network as a monitoring object, it is necessary to monitor traffics in a plurality of monitoring sites, to compare a relation between a plurality of events to aggregate the events for every kind, and to aggregate the events of different kinds to one event. Especially, a great deal of traffics brings about a scalability problem. For example, in order to provide a service of high reliability to a user, a large-scale ISP (Internet Services Provider) monitors important events (fault, error in configuration, attack, and signaling setting (assuming charge)). It is extremely important for the ISP to quickly take a measure to an event when detecting the event. Therefore, a high-efficiency and high-scalability distribution monitoring system is demanded which can monitor a great deal of traffics in a large-scale network.

As the distribution monitoring system of the large-scale network, a centralized system and a hierarchized and centralized system are proposed. In these systems, all monitoring data are directly transmitted to a central node, or once collected by intermediate nodes and arbitrated before being transmitted to the central node. However, there are problems in scalability and reliability in the centralized system or the hierarchized and centralized system. Therefore, these systems are not suitable for many monitoring applications.

In order to solve these problems, "WormShield: Fast Worm Signature Generation with Distributed Fingerprint Aggregation" (Non-Patent Literature 1) (IEEE Transactions on Dependable and Secure Computing, Vol. 4, No. 2, pp. 88-104, April-June, 2007) is proposed by Min Cai, Kai Hwang, Jianping Pan, Christos Papadopoulos.

Also, "Distributed Aggregation Algorithms with Load-Balancing for Scalable Grid Resource monitoring" (Parallel and Distributed Processing Symposium, 2007. IPDPS2007. IEEE International Volume, Issue, 26-30, March 2007 pp. 1-10) (Non-Patent Literature 2) is proposed by Cai, M., Hwang, K.

In Non-Patent Literature 1, the monitoring application performs processing to calculate a total of events for a worm to generate a signature. In Non-Patent Literature 2, the monitoring application performs processing to monitor an average CPU use rate over multiple nodes. In Non-Patent Literature 1 and Non-Patent Literature 2, DAT (Distributed Aggregation Tree) is proposed in which consideration of the load distribution, the scalability and the fault tolerance is carried out by using a P2P (Peer to Peer) network technique and the monitoring data are transferred and aggregated.

The DAT has a tree structure and operates on Chord which is one of the algorithms of DHT. While data are aggregated from a node to a node, the aggregation result is finally transmitted to a route node which exists on the DAT. It should be noted that the DHT is one of the structured P2P networks. The structured P2P network is one in which a network configuration (search request, route) can be described by an equation. As well-known algorithm of the DHT, there are Chord, Pastry, CAN (Content Addressable Network) and so on.

When using these types of DHT algorithms, it is possible to store data and perform data search in a high reliability, because the high scalability and the fault tolerance are considered.

The data is not directly transmitted to a route node but the data is transmitted to the route node by repeating transmission from a node to a next node. Therefore, the network band and the processing load in the route node can be reduced, compared with a case that the data is directly transmitted to the route node. Moreover, by arranging the nodes to as uniform depth as possible, the load is distributed.

However, the techniques shown in Non-Patent Literature 1 and Non-Patent Literature 2 have simple monitoring functions of counting events, and do not have flexibility, so that the monitoring objects to which the above techniques can be applied are limited.

For example, the applications of the Internet such as VoIP (Voice over IP), IPTV, and VOD (Video On Demand) are configured of a control plane (signaling plane) and a data plane (user plane). Therefore, VoIP uses SIP (Session Initiation Protocol) as the protocol for a signaling and RTP (Real-time Transport Protocol) as the protocol for transmitting an audio signal. The SIP and the RTP sometimes pass different routes on the network. Therefore, the techniques proposed in Non-Patent Literature 1 and Non-Patent Literature 2 cannot efficiently relate the events.

Therefore, the technique is demanded which efficiently relates events generated in the control plane and the data plane.

In conjunction with the above description, a traffic data collecting apparatus is disclosed in JP 2003-158549A (Patent Literature 1). In a request receiving node of this technique, when a request of traffic data collection is received from a user terminal or a network management terminal for traffic data collection among two specific points in an IP communication network is received, a data request packet containing the request is transmitted to a neighbor communication unit in response to the received request. A data reply packet in which traffic data of a plurality of communication units other than its own unit are written is received from the neighbor communication unit, and the traffic data of its own unit and the received traffic data are aggregated. A data reply packet which contains the aggregated traffic data is transmitted to the terminal which requested a traffic data collection. In a request relay node, the data request packet is received, and the data reply packet is generated based on the traffic data in its own unit in response to the request contained in the received data request packet and the generated data reply packet is transmitted to the request receiving node. The data request packet containing the request is transmitted to the communication units other than a transmission source of the data request packet. In a request termination node, the data request packet is received, and the data replay packet is generated based on the traffic data in its own unit in response to the request contained in the received data request packet, and is transmitted to the request receiving node. The received data request packet is discarded.

In JP 2007-013590A (Patent Literature 2), a network monitoring system is disclosed. In this technique, communication data of a communication signal which flows through each monitoring line is always collected, and packet data and flow statistic data relating a transmission source and a transmission destination to each other are determined based on header data of the communication signal. The traffic data is aggregated by grouping collected data for every preset physical aggregation object.

Also, as a mechanism in which the event attribute to be collected is specified to provide a monitoring function, "A Scalable Distributed Information the management System" (ACM SIGCOMM Computer Communication Review Vol. 34, Issue 4 (October 2004) Pp. 379-390, Year of Publication: 2004) is proposed by Praveen Yalagandula, Mike Dahlin (Non-Patent Literature 3).

However, in the method shown in Non-Patent Literature 3, the load distribution is not considered in the tree structure of nodes.

In the wide area network monitoring, a manager collects data from the network, and there is a case that the detailed data is further requested, depending on the contents of the collected data. For example, when an event that a worm is generated occurs, there is a case that the data of an actual packet is referred to.

In order to realize such an operation, a function of acquiring the detailed data related to the event (to be referred to as a "back tracking function", hereinafter) is necessary as a mechanism for the wide area monitoring, in addition to collection of the events from the whole network.

However, in Non-Patent Literature 1, Non-Patent Literature 2, and Non-Patent Literature 3, it is difficult for a manager to refer to the details of the collected data from behind, because there is the back tracking function.

CITATION LIST

Patent Literature

[Patent Literature 1]: JP 2003-158549A
[Patent Literature 2]: JP 2007-013590A

Non-Patent Literature

[Non-Patent Literature 1] "WormShield: Fast Worm Signature Generation with Distributed Fingerprint Aggregation," (IEEE Transactions on Dependable and Secure Computing, Vol. 4, No. 2, pp. 88-104, April-June, 2007) by Min Cai, Kai Hwang, Jianping Pan, Christos Papadopoulos
[Non-Patent Literature 2]
"Distributed Aggregation Algorithms with Load-Balancing for Scalable Grid Resource monitoring" (Parallel and Distributed Processing Symposium, 2007. IPDPS2007. IEEE International Volume, Issue, 26-30 Mar. 2007 Page (s):1-10) by Cai, M., Hwang, K.,
[Non-Patent Literature 3]
"A Scalable Distributed Information the management System" (ACM SIGCOMM Computer Communication Review Volume 34, Issue 4 (October 2004) Pp. 379-390 Year of Publication: 2004) by Praveen Yalagandula, Mike Dahlin

SUMMARY OF THE INVENTION

The present invention provides a distribution monitoring system in which scalability and fault tolerance are considered while the load distribution is carried out, and it is possible to monitor the advanced function such as the monitoring of an application which uses a control plane and a data plane.

Moreover, in the present invention, a back tracking function is added to the above-mentioned distribution monitoring system according to the necessity.

In a first aspect of the present invention, A network distribution monitoring method executed by a computer which configures each of a plurality of nodes, in a network which comprises said plurality of nodes which are connected with a management network, said network distribution monitoring method includes: generating a first detection message by detecting a first traffic on an object network by a corresponding one of a plurality of first applications which are predetermined, in each of first probe nodes of said plurality of nodes; transmitting said first detection message to a node determined from a first hash value to only a first function identifier showing a kind of said corresponding first application or said first function identifier and address data of said first traffic; generating a first mediation processing result by performing first mediation processing on said first detection message to said plurality of first applications, in a first mediation node of said plurality of nodes; and storing said first mediation processing result in a first collector node of said plurality of nodes.

In a second aspect of the present invention, a computer-readable a program to make a computer function as each of a plurality of nodes in a network which comprises said plurality of nodes, said computer-readable program comprising: generating a detection message by detecting a traffic on an object network by a corresponding one of a plurality of applications, in each of making said computer function as a probe node; and transmitting the detection message to a node determined from a hash value to only a function identifier showing a kind of said corresponding application or said function identifier and address data of said traffic. It should be noted that the program may be stored in storage medium (media).

In a third aspect of the present invention, a network distribution monitoring system includes: a management network; and a plurality of nodes connected with a monitoring object network and configuring said management network. The plurality of nodes includes: a probe node configured to generate a detection message by detecting a traffic on an said monitoring object network by a corresponding one of a plurality of first applications which are predetermined, to determine a hash value to only a function identifier showing a kind of the corresponding first application or address data of said traffic and the function identifier, and to transmit said detection message to any of (i) a node which is determined from said hash value and the DAT for said traffic, (ii a node which is predetermined with respect to said hash value and said management network and (iii) a node which is dynamically determined with respect to said hash value and said management network; a mediation node configured to generate a mediation processing result by performing mediation processing on said detection message to said plurality of applications; and a collector node configured to store said mediation processing result.

In other aspects of the present invention, a node is provided which is used in the network distribution monitoring system.

In each of the above-mentioned aspects, a collector node in the plurality of nodes may have a function of inquiring detailed data to all probe nodes which captured the packet related to an event by tracing the nodes on the DAT. Also, all the probe nodes which captured the packet related to the event has a function of transmitting the detailed data to the collector node of said plurality of nodes by tracing the nodes on the DAT. Moreover, in order to perform back tracking, each node may have data of a kind, a lower node ID of an event, a count of the event, a time of first reception of an event, and a time of last reception of the event.

According to the present invention, a flexible monitoring system is provided in which it is possible to monitor the advanced function such as the monitoring of an application which uses a control plane and a data plane, in addition to a simple monitoring application such as counting of the events.

Also, according to the present invention, different monitoring object applications can coexist. Even if the monitoring object applications are different, a same monitoring function is prepared when the function which is used for the monitoring is common to them. Therefore, the function needs not to be developed.

Moreover, according to the present invention, by adding the back tracking function, a manager can refer to the detailed data of the packet.

BRIEF DESCRIPTION OF THE DRAWINGS

FIG. 4 is a diagram showing an example of a rule table in the distribution monitoring system according to the first exemplary embodiment of the present invention;

FIG. 5 is a diagram showing an example of a monitoring table in the distribution monitoring system according to the first exemplary embodiment of the present invention;

FIG. 6 is a diagram showing a node table in the distribution monitoring system according to the first exemplary embodiment of the present invention;

FIG. 7A is a flow chart showing an operation of the monitoring node in the distribution monitoring system according to the first exemplary embodiment of the present invention;

FIG. 9 is a block diagram showing the configuration of the second exemplary embodiment of the present invention;

FIG. 12 is a diagram showing an example of a back track table in the distribution monitoring system according to the third exemplary embodiment of the present invention;

FIG. 13 is a flow chart showing an operation of a monitoring node loaded with the back tracking function in the distribution monitoring system according to the third exemplary embodiment of the present invention; and FIG. 14 is a block diagram showing an example of a hardware configuration to realize the distribution monitoring system according to each exemplary embodiment of the present invention.

DESCRIPTION OF EXEMPLARY EMBODIMENTS

Hereinafter, a communication system applied with a distribution monitoring system of the present invention will be described in detail with reference to the attached drawings by using VoIP as an example.

In this example, a probe or a probe node captures a packet from a network interface and provides data of the packet. Mediation is a function of combining and reducing data obtained from the node. A node having the mediation function is called a mediator. A collector node is a node which collects all the data subjected to the mediation. A node is a unit existing on the network. The probe, the mediator, and the collector are a kind of the nodes. A unit having the function of the probe and the function of the mediator is referred to as a node.

First Exemplary Embodiment

Figure 1:
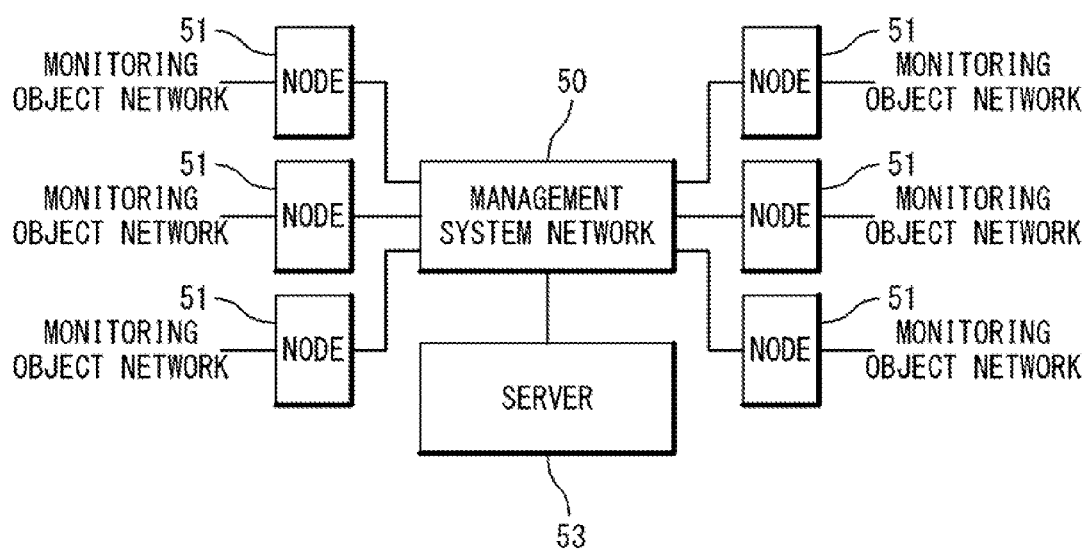
FIG. 1 is a diagram showing a distribution monitoring system according to a first exemplary embodiment of the present invention.

FIG. 1 is a diagram showing a distribution monitoring system according to a first exemplary embodiment of the present invention. As shown in FIG. 1, the distribution monitoring system is provided with a management system network 50. A plurality of monitoring nodes 51-$i$ (i=1, 2, ..., n) and a server 53 are connected with the management system network 50. Also, the plurality of monitoring nodes 51-$i$ are respectively arranged at fixed positions in a monitoring object network, to monitor traffics which flow through the arrangement positions in the monitoring object network. Each of the monitoring nodes 51-$i$ has a node identification (ID). Each monitoring node 51-$i$ transmits a monitoring result of the traffics to other nodes 51-$j$ (i≠j) through the management system network 50. In this example, in order to make it easy to understand the present invention, the server 53 is one but in actual service, the number of servers may be plural.

Figure 2:
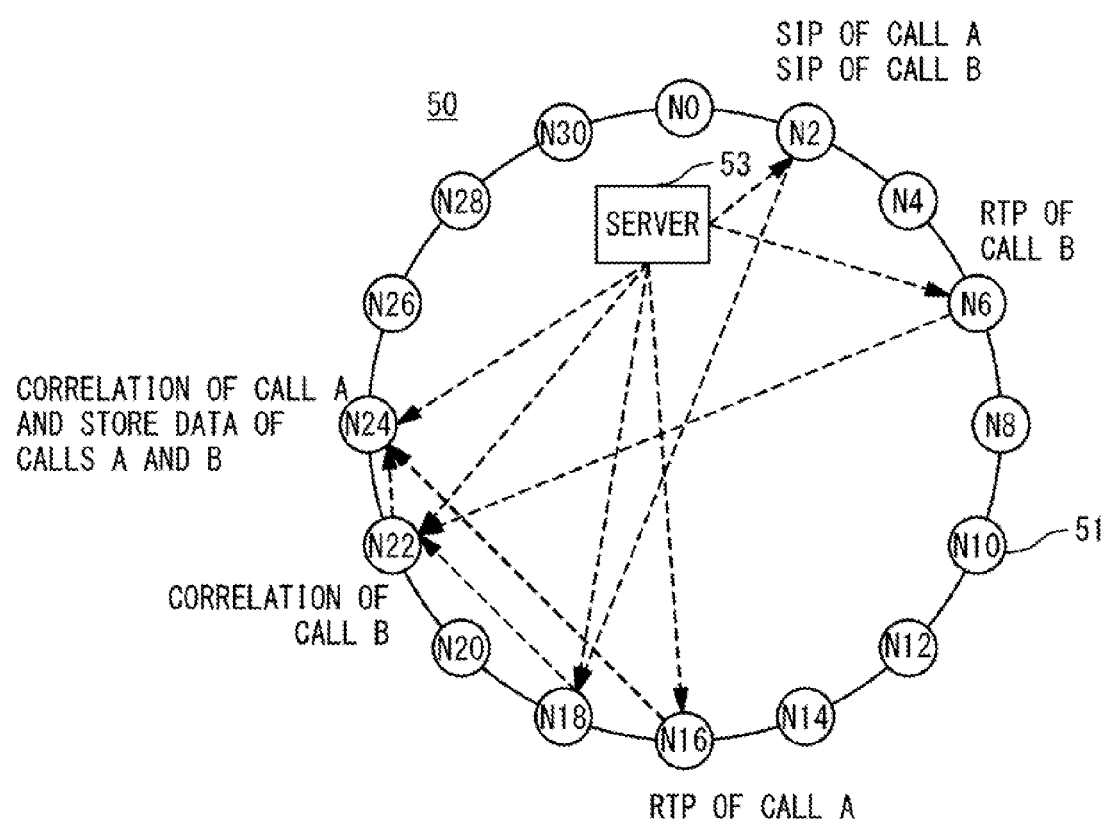
FIG. 2 is a diagram showing a configuration example of a management node network in the distribution monitoring system according to the first exemplary embodiment of the present invention.
Figure 10A:
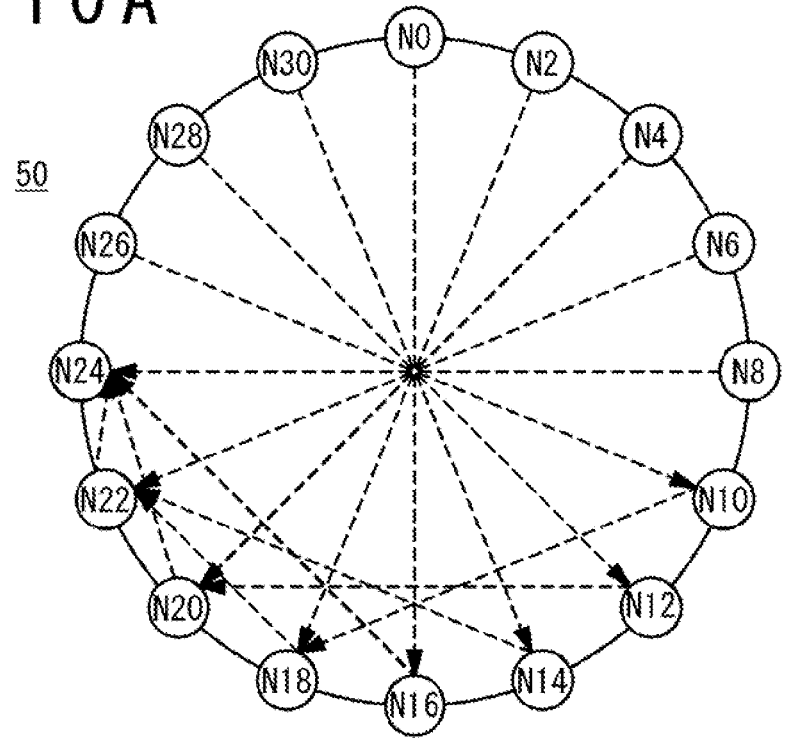
FIG. 10A is a diagram showing an example of the management node network in the distribution monitoring system of the present invention.
Figure 10B:
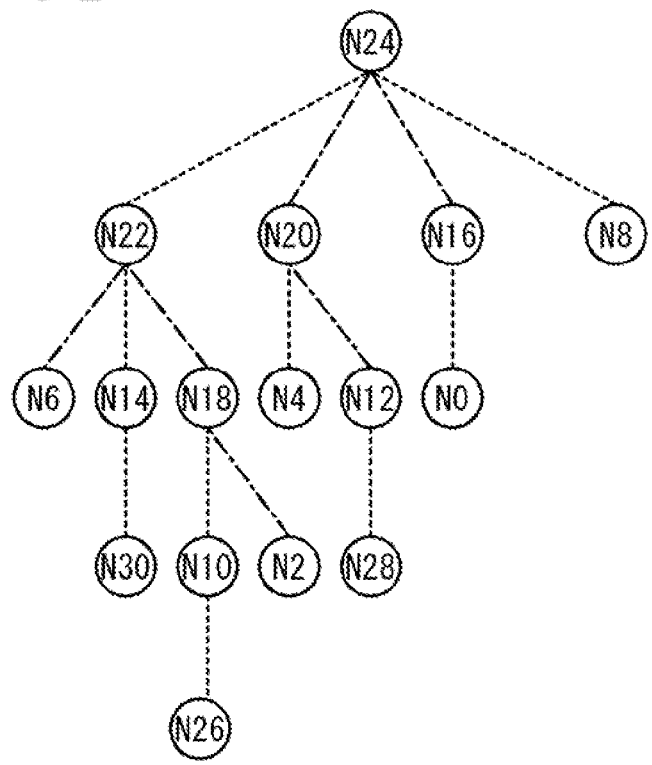
FIG. 10B is a diagram showing DAT configuration corresponding to the management node network in the distribution monitoring system of the present invention.

FIG. 2 shows a transfer example of a message in the distribution monitoring system of the present invention. FIG. 10A shows the transfer example of the present invention in detail, and FIG. 10B shows a DAT structure. The management system network 50 has 16 monitoring nodes N2, N4, ..., N30 and the server 53. The server 53 distributes a rule table and a monitoring table (to be described later) to the monitoring nodes N2, N6, N16, N18, N22, N24 of the above-mentioned monitoring nodes at least. The server 53 distributes a node table (to be described later) to all the monitoring nodes.

The monitoring node N2 monitors traffics passing through it, and detects SIP packets in the call A and the call B in the SIP application, to transmit to the monitoring node N18. The monitoring node N6 monitors the traffics passing through it, and detects the RTP packets in the call B, to transmit to the monitoring node N22. The monitoring node N16 monitors traffics passing it, and detects the RTP packets in the call A, to transmit to the monitoring node N24. The monitoring node N18 transmits the detection result of the SIP packets in the calls A and B from the monitoring node N2 to the monitoring node N22. The monitoring node N22 receives the detection result of the RTP packet in the call B from the monitoring node N6, receives the detection result of the SIP packet in the call B from the monitoring node N18, calculates correlation between those detection results, and transmits the correlation processing result to the monitoring node N24. The monitoring node N24 receives the correlation processing result in the call B from the monitoring node N22, and stores it. Also, the monitoring node N24 receives the detection result of the SIP packet in the call A from the monitoring node N22, receives the detection result of the RTP packet in the call A from the monitoring node N16, calculates correlation between those detection results and stores the correlation processing result.

In this example, the two results of correlation are stored in the monitoring node N24. However, the present invention is not limited to this, and the results may be stored in other monitoring nodes.

Figure 3:
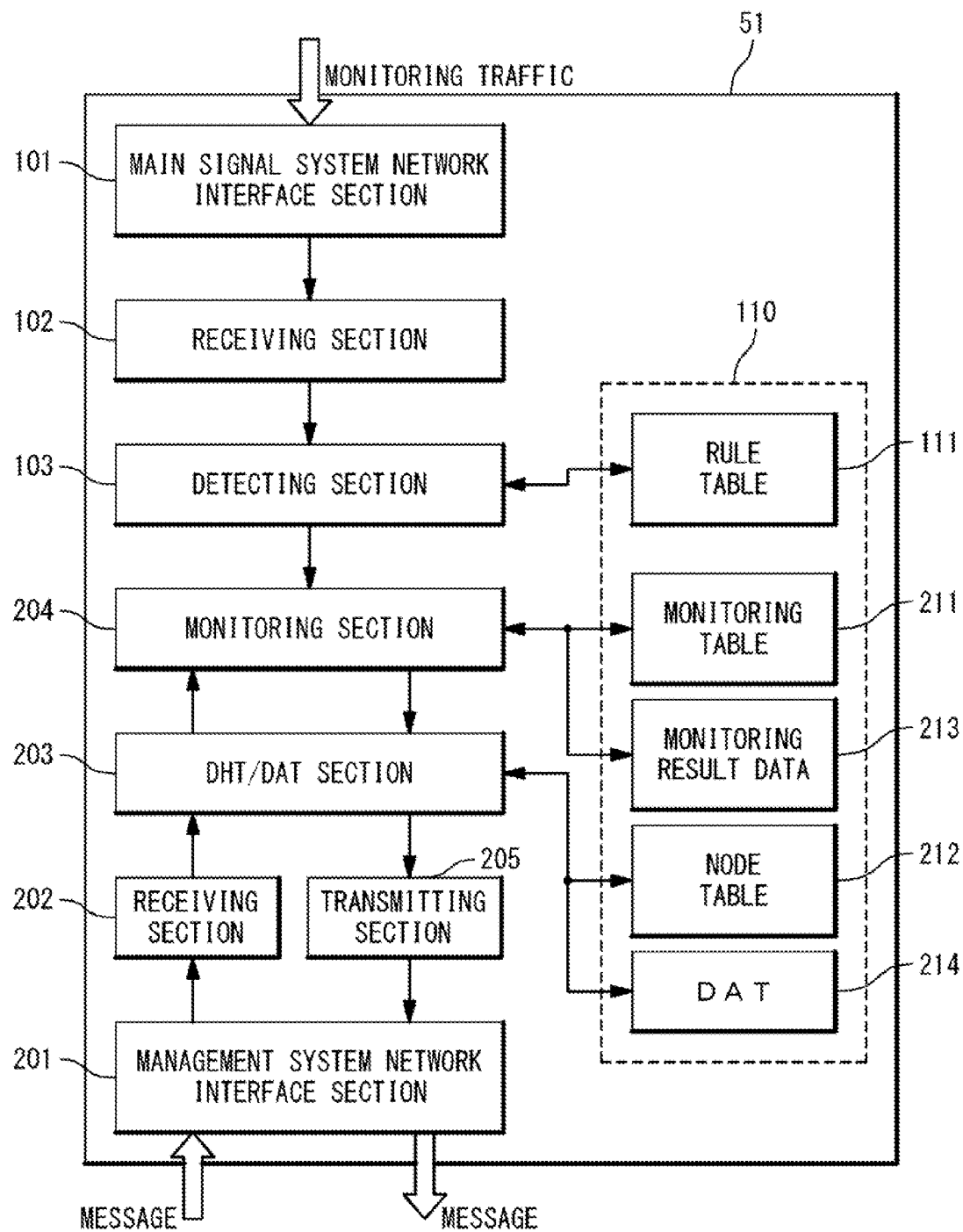
FIG. 3 is a block diagram showing the configuration of a monitoring node in the distribution monitoring system according to the first exemplary embodiment of the present invention.

FIG. 3 is a block diagram showing a configuration of each monitoring node in the distribution monitoring system according to the first exemplary embodiment of the present invention. Referring to FIG. 3, each monitoring node 51-$i$ in the first exemplary embodiment is provided with a main signal system network interface section 101, a receiving section 102, a detecting section 103, a management system network interface section 201, a receiving section 202, a DHT/DAT section 203, a monitoring section 204, a transmitting section 205, and a storage section 110. In the storage section 110, a rule table 111, a monitoring table 211, a node table 212, a monitoring result data buffer 213, and a DAT buffer 214 are stored. Each of the sections of the monitoring node other than the storage section 110 may be realized in hardware, in software or a mixture of them. When being realized in software, a program is installed in the storage section in the monitoring node. Or, it may be realized by loading a program from an external storage medium (media), and executing the program by a CPU or a processor.

The receiving section 102 receives traffic data from a monitoring object network 52 through the main signal system network interface section 101. The receiving section 102 carries out a stream reconfiguration and a session management necessary to monitor the traffics to the traffic data according to the necessity. The receiving section 102 sends a message which is contained in the traffic data to the detecting section 103.

When receiving the message from the receiving section 102, the detecting section 103 refers to a rule registered on the rule table 111, and confirms whether or not the message corresponds to the rule. When detecting that the message corresponds to the rule, the detecting section 103 sends a notice message to the monitoring section 204.

FIG. 4 shows the rule table 111. The rule table 111 has a plurality of entries, and a rule to specify the message to be detected is registered on each entry. These rules are transmitted from the server 53 to the monitoring node and are stored in the rule table 111. That is, the server 53 transmits these rules to the monitoring nodes. The monitoring node receives and stores these rules in the rule table 111. For example, in some rule, the protocol is SIP, a transmission source IP address is 192.168.0.1, a transmission destination IP address is 192.168.0.11, a transmission source SIP-URI (Uniform Resource Identifier) is sender1@sip.com, a transmission destination SIP-URI is receiver1@sip.com, and an SIP method is INVITE. This rule is to confirm that such one message flowed per one second.

The monitoring section 204 processes the notice message received from the detecting section 103 based on data retained in the monitoring table.

FIG. 5 shows an example of the monitoring table 211. The monitoring table 211 shows the plurality of entries. Each entry of the monitoring table 211 has a consecutive number, a function name showing a function to be monitored, a function identifier to specify the function to be monitored (the identifier showing a kind of the application to be monitored), an argument of a hash function, and a mediation-type data. These entries are transmitted from the server 53 to the monitoring node and are stored in the monitoring table 211. That is, the server 53 transmits these entries to the monitoring nodes. The monitoring node receives and stores these entries in the monitoring table 211. For example, in the entry of No. 7, the function name is VoIP monitoring. The function identifier is 7. The argument of a hash function is a function identifier. The mediation type is correlation between the SIP and the RTP (e.g. IP address, and port number). Also, in the entry of No. 8, the function name is IPTV monitoring. The function identifier is 8. The argument with a hash function is a function identifier and a transmission source IP address. The mediation type is correlation between SIP and RTP (e.g. IP address, and port number). In this example, the function identifier and the transmission source IP address are used. However, a transmission destination IP address may be used or both of the IP addresses may be used. Moreover, both of transmission source URI and transmission destination URI or one of them may be used. By selecting an input of the hash function, the scalability can be dynamically controlled.

The monitoring section 204 extracts a function identifier from the notice message received from the detecting section 103, and confirms whether or not there is an entry corresponding to the extracted function identifier. When the entry exists, the monitoring section 204 refers to the monitoring result data buffer 213 to determine whether or not the monitoring result data has been stored. Also, the monitoring section 204 refers to the field of the mediation type of the entry, and executes a mediation process by using the monitoring result data in the notice message and the monitoring result data in the monitoring result data buffer 213. In this example, when the extracted function identifier is 7, the monitoring section 204 refers to the IP address and the port number, configures the data of RTP if there is the data of RTP which belongs to some SIP session, and relates it to the same session as the VoIP application. If the data of RTP which belongs to some SIP session is not in the monitoring result data buffer 213, the monitoring section 204 performs nothing. Moreover, when receiving the notice message containing the data of RTP from another monitoring node, the monitoring section 204 stores the data of RTP in the monitoring result data buffer 213.

Because the argument of a hash function is a function identifier, the monitoring section 204 obtains "24" by calculating the hash function hash (7). In this way, it could be understood that the monitoring node (route monitoring node or collector monitoring node) to which the message is sent finally is the monitoring nodes N24 having the node ID of "24". The monitoring section 204 transfers this node ID and the mediation processing result to the DHT/DAT section 203 as an event.

It should be noted that it is determined based on a value outputted from the hash function, which of the nodes becomes a collector node.

Therefore, there is a case that a node becomes a collector node and sometimes becomes a mediation node. Moreover, the node which becomes a collector node in a monitoring application, becomes a collector node in another monitoring application. Also, a node which becomes a mediator node in a monitoring application, becomes a mediator node in another monitoring application. That is, the plurality of monitoring applications share the management system network.

Figure 6:
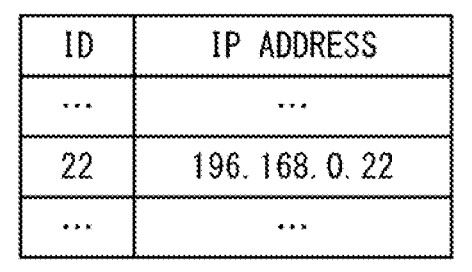

The DHT/DAT section 203 refers to the DAT buffer 214 which stores a predetermined DAT shown in FIG. 2, prepares transmission of the processing result received from the monitoring section 204 to a next monitoring node on the DHT/DAT. The DHT/DAT section 203 refers to the DAT in the DAT buffer 214 based on a node ID of the collector monitoring node and its own node ID and determines the next transmission destination node. FIG. 2 is a diagram showing an example of the DAT. For example, when its own node is 18, it could be understood that the DHT/DAT section 203 should send the message containing a processing result to the monitoring node N22 having node ID of "22". Next, the DHT/DAT section 203 refers to the node table 212 based on the node ID of "22" of the transmission destination monitoring node to acquire the IP address of the node specified by the node ID. FIG. 6 shows an example of the node table 212. The DHT/

DAT section 203 finds that data should be transmitted to the IP address, 192.168.0.22, corresponding to the node ID of "22". The DHT/DAT section 203 transfers a message and the acquired transmission destination IP address to the transmitting section 205. In this example, the transmission destination is determined based on the predetermined DAT. However, the transmission destination may be determined by another method. At that time, the transmission destination may be dynamically determined every time and may be determined in advance.

The transmitting section 205 transmits a message from the DHT/DAT section 203 to the transmission destination IP address through the management system network interface section 201.

Also, when receiving a message from another monitoring node through the management system network interface section 201, the receiving section 202 transfers the message to the monitoring section 204 through the DHT/DAT section 203. The monitoring section 204 performs the same processing as described above and determines the node ID of the final destination monitoring node, transfers this node ID and the mediation processing result to the DHT/DAT section 203 as an event. The DHT/DAT section 203 refers to the DAT in the DAT buffer 214 to prepare the transmission of the processing result received from the monitoring section 204 to the next monitoring node on the DHT/DAT.

Next, the whole operation of the distribution monitoring system according to the first exemplary embodiment of the present invention will be described. In this example, the monitoring nodes N2, N6, and N16 are probe nodes, the monitoring nodes N16 and N22 are the mediator nodes, and the management node N24 is a collector node.

It is assumed that two VoIP calls of call A and call B are originated on the monitoring object network. Moreover, it is assumed that the SIP traffics in the call A and the call B passes the probe node N2, the RTP traffics in the call B pass the probe node N6, and the RTP traffics in the call A pass the probe node N16.

First, the call A will be described. The monitoring node N2 detects an SIP packet by using the rule table 111 of FIG. 4. Also, it can be found that the function identifier of the VoIP monitoring is 7, from the monitoring table 211 of FIG. 5. In this example, because it can be found from the hash function hash (7)=24 that the node ID of the collector monitoring node is "24", the monitoring node N2 transmits a message which contains the monitoring result data and the function identifier, to the monitoring node N18 based on the DAT of FIG. 2 (expressed as store (hash (7))=<7, DATA>).

Similarly, the monitoring node N16 detects an RTP packet, and transmits a message which contains the monitoring result data and the function identifier to the collector monitoring node N24.

When receiving the message from the monitoring node N2, the monitoring node N18 checks whether or not the same function identifier as the function identifier in the message exists in the monitoring table 211 of the monitoring node N18. When the same function identifier exists, the monitoring node N18 performs processing based on the mediation type corresponding to the same function identifier. Also, when the same function identifier does not exist, the monitoring node N18 refers to the DAT and transmits the received message to the monitoring node N22. When receiving the message from the monitoring node N18, the monitoring node N22 operates in the same manner as the monitoring node 18, and transmits the message to the collector monitoring node N24. By performing the processing in this way, the message arrives at the monitoring node N24 as the collector node. The monitoring node N24 performs the correlation processing between SIP and RTP and stores the correlation processing result. With this, the correlation processing of a stream becomes possible.

The similar processing is performed to the call B. The monitoring node N2 detects the SIP packet in the call B by using the rule table 111 of FIG. 4. Also, it can be found that the function identifier of the VoIP monitoring is "7", from the monitoring table 211 of FIG. 5. Here, because the hash function hash (7)="24", it could be understood that the node ID of the collector monitoring node is "24". Therefore, the monitoring node N2 transmits the message which contains the monitoring result data and the function identifier to the monitoring node N18 based on the DAT of FIG. 2 (expressed as (store(hash (7))=<7, DATA>).

Similarly, the monitoring node N6 detects the RTP packet, transmits the message which contains the monitoring result data and the function identifier to the monitoring node N22.

When receiving the message from the monitoring node N2, the monitoring node N18 determines whether or not the same function identifier as the function identifier in the message exists in the monitoring table 211 of the monitoring node N18. When the same function identifier exists, the monitoring node N18 performs the processing based on the mediation type corresponding to the function identifier. Also, when the same function identifier does not exist, the monitoring node N18 refers to the DAT and transmits the received message to the monitoring node N22.

The monitoring node N22 performs the mediation processing (correlation processing) defined based on the mediation type which is determined based on the message received from the monitoring node N18 and the message received from the monitoring node N6, and transmits the processing result to the collector monitoring node N24. The collector monitoring node N24 receives and stores the correlation processing result. With this, the correlation processing of a stream becomes possible.

In this example, when the monitoring result data of the SIP and the monitoring result data of RTP are collected in the monitoring node N22, the monitoring node N22 performs the correlation processing. When the correlation of all the monitoring result data is calculated, the monitoring node N24 stores the processing result. It should be noted that any node on the DAT can execute (get (hash (7))=7). This get( ) request is transmitted to the collector monitoring node N24, which sends back all the monitoring result data of the monitoring function to the get( ) request source. Also, if specifying an SIP user name as the argument of the hash function, only the corresponding monitoring data can be taken out.

It should be noted that the object subjected to a hash processing is not only the function identifier but may be also a function identifier and address data. For example, the function identifier and a transmission source IP address, or the transmission source IP address and a transmission destination IP address may be used. Moreover, both of transmission source URI and transmission destination URI or one of them may be used. By selecting an input of the hash function, the scalability can be dynamically controlled.

Figure 7B:
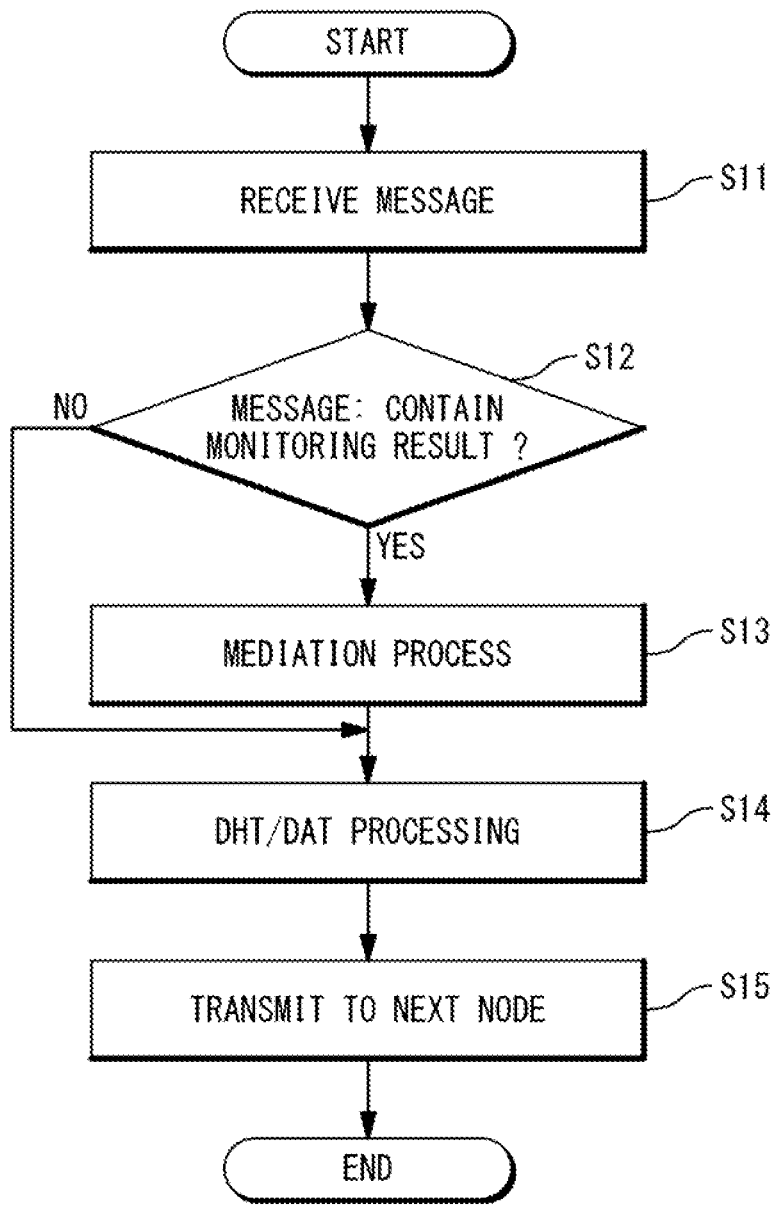
FIG. 7B is a flow chart showing an operation of the monitoring node in the distribution monitoring system according to the first exemplary embodiment of the present invention.

Next, an operation of each monitoring node used in the distribution monitoring system according to the first exemplary embodiment of the present invention will be described with reference to FIG. 7A and FIG. 7B.

First, an operation of transmitting a message received from another node to another monitoring node will be described with reference to FIG. 7A.

(1) Step S1

When the monitoring node N2 receives a packet, which flows on the monitoring object network, through the main signal system network interface section 101, the receiving section 102 performs a termination process on the layers L2, L3, and L4.

(2) Step S2

Next, the receiving section 102 manages a session based on the IP address and the port number. When the packet is a TCP packet or an SCTP packet, a stream reconfiguration is performed to transfer the packet to the detecting section 103.

(3) Step S3

The detecting section 103 checks whether or not the reception packet matches a rule registered on rule table 111. In an example of FIG. 4, the detecting section 103 checks whether an IP address, SIP-URI, or the like is contained in the packet. When the check result matches to the rule (filtering condition), the detecting section 103 notifies an event to the monitoring section 204. By registering the rule (filtering condition) on rule table 111, the monitoring application is determined in advance based on the data of the filtering condition.

(4) Step S4

The monitoring section 204 confirms whether or not an event relating to the event received from the detecting section 103 has been received from another node.

(5) Step S5

When having received the message from the other node, the monitoring section 204 aggregates the events.

(6) Step S6

After that, the monitoring section 204 executes a process in accordance with a mediation type of the monitoring table 211 (FIG. 5). In this example, because the monitoring node N2 does not receive any event from the other node, the monitoring section 204 executes the process on only the event detected by the node with the node ID of "2" based on the mediation type. The monitoring section 204 transfers the mediation process result and the node ID of collector monitoring node N24 to the DHT/DAT section 203.

(7) Step S7

Subsequently, the DHT/DAT section 203 refers to the DAT in the DAT buffer 214 to prepare to transmit the event to the next node on the DHT/DAT. The DHT/DAT section 203 refers to the DAT in the DAT buffer 214 to determine the node of a transmission destination of the message from the node ID of the collector monitoring node. In the example of FIG. 2, the message is transmitted to the monitoring node N18 with the node ID of "18". The DHT/DAT section 203 refers to the node table 212 to acquire the IP address of the node ID of "18" and transfers it to the transmitting section 205.

(8) Step S8

The transmitting section 205 transmits the event received from the DHT/DAT section 203 through the management system network interface section 201 for the IP address of the next node.

Next, the operation of receiving a message transmitted from another monitoring node will be described with reference to FIG. 7B.

(1) Step S11

The message transmitted from another monitoring node is received by the receiving section 202 through the management system network interface section 201. The receiving section 202 transfers the received message to the monitoring section 204 through the DHT/DAT section 203.

(2) Step S12

When receiving the message from the DHT/DAT section 203, the monitoring section 204 checks whether or not the message contains the monitoring result data. At this time, if the function identifier in the message is registered on the monitoring table 211, the monitoring section 204 stores the monitoring result data (e.g. RTP data), along with data necessary to transfer to the collector monitoring node, in the monitoring result data buffer 213 based on the function identifier.

(3) Step S13

When the message received from the DHT/DAT section 203 contains the monitoring result data (SIP data), the monitoring section 204 executes the mediation process based on the function identifier to calculate a correlation between the SIP data and the RTP data stored in the monitoring result data buffer 213. After that, the monitoring section 204 transfers the mediation process result and the node ID of the collector monitoring node N24 to the DHT/DAT section 203.

(4) Step S14

Next, the DHT/DAT section 203 refers to the DAT in the DAT buffer 214 to prepare to transmit a message to the next node on the DHT/DAT. The DHT/DAT section 203 refers to the DAT in the DAT buffer 214 to determine a transmission destination node of the message from the node ID of the collector monitoring node. In the example of FIG. 2, the message is transmitted to the monitoring nodes N18 with the node ID of "18". The DHT/DAT section 203 refers to the node table 212 to acquire the IP address of the node ID of "18" and transfers it to the transmitting section 205.

(5) Step S15

The transmitting section 205 transmits the event received from the DHT/DAT section 203 through the management system network interface section 201 for the IP address of the next node.

Second Exemplary Embodiment

Next, the distribution monitoring system according to the second exemplary embodiment of the present invention will be described.

Figure 8:
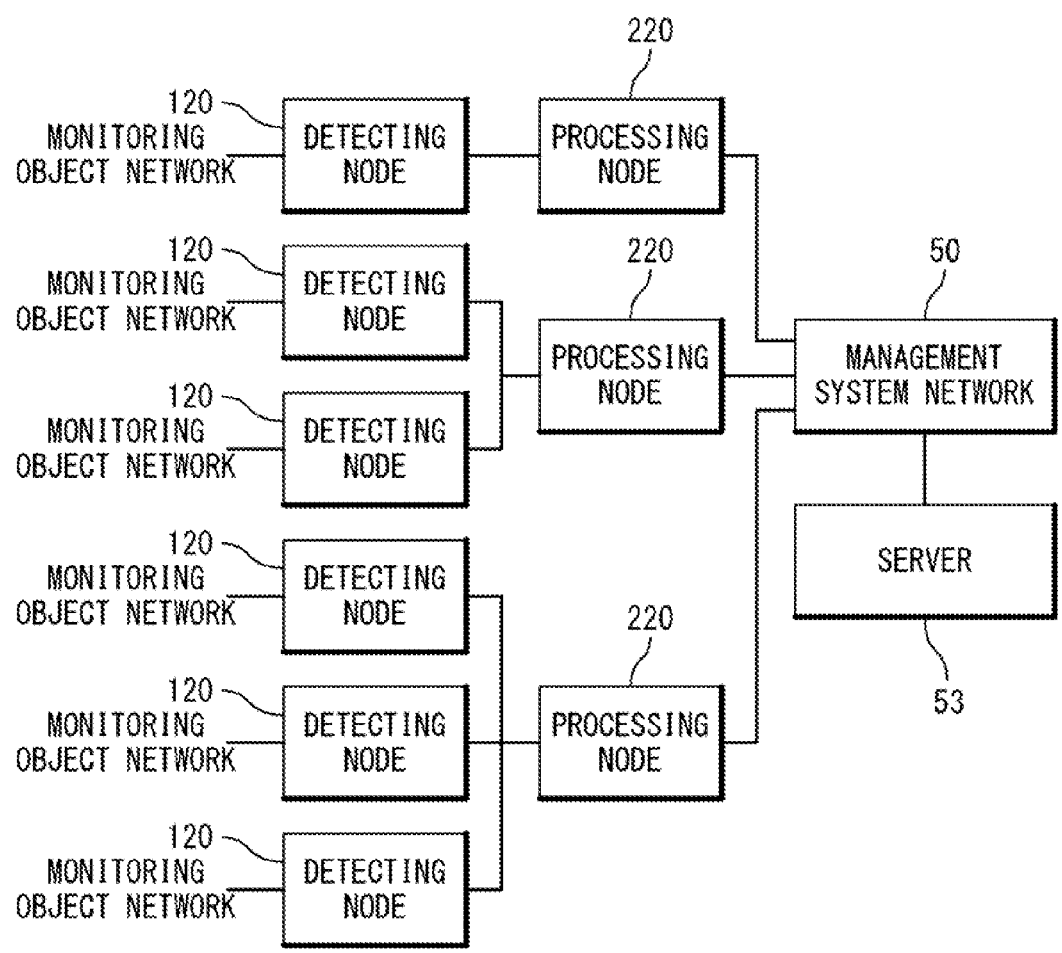
FIG. 8 is a diagram showing the distribution monitoring system according to a second exemplary embodiment of the present invention.

In FIG. 1, each monitoring node has all of the functions, but in FIG. 8, the nodes of the distribution monitoring system according to the second exemplary embodiment are divided into two kinds of nodes: detecting nodes 120 for detection, and processing nodes 220 for monitoring. The functions are the same when each node has all the functions. When the monitoring nodes 51-$i$ shown in FIG. 3 are grouped into the detecting nodes 120 and the processing nodes 220, one or more detecting nodes 120 can be connected with one processing node 220, as shown in FIG. 8.

FIG. 9 shows the detecting node 120 and the processing node 220. In the detecting node 120 of the second exemplary embodiment, the main signal system network interface section 101, the receiving section 102, the detecting section 103, and the rule table 111 are the same as those of the first exemplary embodiment. Therefore, the description of the configuration and operation is omitted. The interface section 104 has a transmission function, and transmits an event message to the processing node 220 as the monitoring node when the reception packet matches the rule registered on rule table 111.

Like the first exemplary embodiment, the detecting section 103 confirms whether or not the message matches the rule (filtering condition) registered on rule table 111. An application as a monitoring target is determined in advance based on the filtering condition.

The processing node 220 of the second exemplary embodiment is provided with the management system network interface section 201, the receiving section 202, the DHT/DAT section 203, the monitoring section 204, the transmitting section 205, the interface section 206, the monitoring table 211, the node table 212, and monitoring result data buffer 213$m$ and the DAT buffer 214. Ones of these components other than the interface section 206 and the DAT buffer 214 are the same as corresponding components of the first exemplary embodiment. Therefore, the description of configuration and operation is omitted. The interface section 206 has a receiving function and receives the event message transmitted from the detecting node 120 to transfer to the monitoring section 204.

Like the first exemplary embodiment, the object of hash processing is not only the function identifier but may also be a function identifier and address data. For example, it is a function identifier and a transmission source IP address, or a transmission source IP address and a transmission destination IP address. Moreover, both of transmission source URI and transmission destination URI or one of them may be used. By selecting an input of the hash function, the scalability can be dynamically controlled.

In the distribution monitoring system of the second exemplary embodiment, mediation results are collected by the collector monitoring node N24 and are stored.

Like the first exemplary embodiment, which of the nodes becomes a collector node is determined based on an output value of the hash function. Therefore, a node is determined to be a collector node or to be a mediation node. Moreover, a node is determined to be a collector node in a monitoring application, and to be a collector node in another monitoring application, or the node is determined to be a mediator node in a monitoring application and to be a mediator node in another monitoring application. In other words, the plurality of monitoring applications shares the management system network.

In the above-mentioned exemplary embodiment, for example, the monitoring node N22 relates two detection results of the SIP traffic and the RTP traffic and transmits as the relating result to the monitoring node N24. However, the kinds of the traffics to be related to each other are not limited to "2". For example, the kinds of the traffic may be equal to or more than "3". In this case, the detection results of the traffics of all kinds are related to each other by one the monitoring node. However, the first node may relate to the detection results of the traffics of the two kinds, and the kind of the remaining may relate the detection results of the traffics and the kind to each other. In this way, the message may be transferred while relating to each other in an order.

Also, if nodes are arranged such that the depth of the hierarchy of the DAT is constant, the load distribution can be more attained. The arrangement is not limited to the DAT and may be applied with another data aggregation algorithm.

Also, in the present invention, the distribution monitoring system of the communication system for VoIP has been described. However, for example, the different monitoring applications of this distribution monitoring system may carry out the monitoring of QoS (Quality of Service) of the communication system and the monitoring of the security at a same time.

Also, by limiting data in each field of each table, the filtering function is realized and the desired traffic can be monitored.

Also, in the present invention, it is determined based on a rule table distributed from the server 53 that the monitoring node should monitor and detect the traffic of which of the applications as the probe node. The collector node to which the data of the detection result is finally transferred is determined based on the monitoring table. Specifically, a hash function value defined in the monitoring table is calculated and the node ID of the collector node is determined. The monitoring node to which the detection result should be transferred next is determined from the node ID and the DAT. If the monitoring node of a transmission destination is a related node, a plurality of detection result data received by the node are related to each other, and the next node is determined, as mentioned above.

In this way, if various tables are dynamically distributed from the server 53 to the monitoring node for every application, the load can be distributed with respect to not only the nodes but also time.

It has been described that the rule table and the monitoring table are delivered to the node through the management system network. However, it may be delivered through a server network (not shown) from the server 53. In this case, it is desirable that the monitoring node has an interface with the server independently of the above configuration. Also, as in the second exemplary embodiment, when the monitoring node is divided into the detecting node and the processing node, the rule table and the monitoring table may be delivered to the detecting node from the server 53, and the monitoring table may be delivered to the processing node from the detecting node through an interface section of the detecting node and an interface section of the processing node.

In the first and second exemplary embodiments, a network is configured in DHT/DAT. Moreover, the collector node is determined based on the hash value. Thus, the different monitoring applications can be supported while being scalability and fault tolerance.

In this way, in the monitoring system of the present invention, while the scalability and the fall tolerance are considered, the monitoring of the advanced function such as the monitoring of an application which uses a control plane and a data plane is possible.

Third Exemplary Embodiment

Next, the distribution monitoring system according to a third exemplary embodiment of the present invention will be described. In this exemplary embodiment, moreover, a case of adding a back tracking function to the distribution monitoring system in each of the above-mentioned exemplary embodiments will be described.

Hereinafter, the configuration and operation of the back tracking function will be described by using detection of a worm as an example.

In case of worm detection, it is supposed that the probe node has a filter circuit for detecting a packet from which the worm is generated. When the probe node detects the packet from which the worm is generated, the data of the packet is transmitted to the mediator node and the collector node by using a mechanism of the DAT. When a large amount of events indicating detection of the packet from which the worm is generated are collected to the collector node, the operator can confirm the data of the packet about the event by using the back tracking function.

Figure 11:
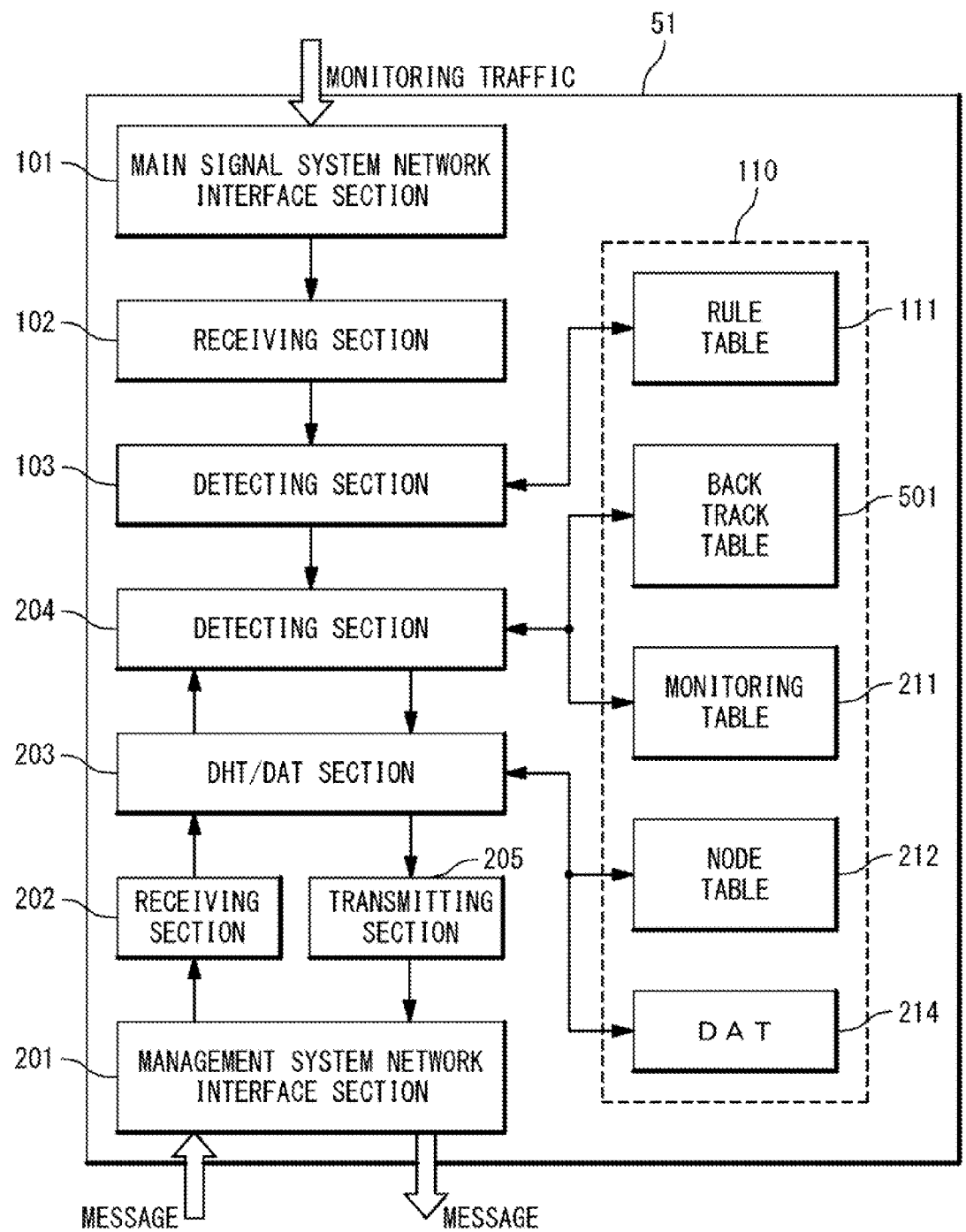
FIG. 11 is a block diagram showing the configuration of a monitoring node loaded with a back tracking function in the distribution monitoring system according to a third exemplary embodiment of the present invention.

The configuration will be described with reference to FIG. 11, in which a back track table 501 for the back tracking function is added to the first exemplary embodiment shown in FIG. 3.

It should be noted that the back tracking function can be provided by adding the back track table 501 to the processing node 220 of FIG. 9 in the second exemplary embodiment.

An example of the back track table 501 is shown in FIG. 12. In the back track table 501, a kind of an event, a lower node ID, a count of the event, the reception time of the first event, the reception time of the last event are stored. Every time an event is collected in the collector node, data is stored in the back track table 501 for each node.

When the operator issues a back tracking instruction to the collector node, the collector node confirms a lower node on the DAT through which the event is passed, and the collector node notifies to each of the concerned nodes on the DAT. By referring to back track table 501, the monitoring section 204 can confirm the lower node ID on the DAT through which the event is passed. The notification to each node on the DAT is made from the monitoring section 204 through the DHT/DAT section 203, the transmitting section 205, and the management system interface 201.

When the lower node receiving the notice is not the probe node, each node confirms the lower node on the DAT through which the event is passed, and notifies the lower node on the DAT. The monitoring section 204 receives the notice through the management system interface 201, the receiving section 202, and the DHT/DAT section 203 in the lower node. When determining that its own node is not a probe node, the monitoring section 204 refers to the back track table 501 to confirm the ID of the lower node and to notify to each of the related nodes on the DAT, similarly.

Each node repeats the above-mentioned processing until arriving at the probe node, and when its own node is the probe node, the monitoring section 204 searches the data of the packet related to the event. Next, the monitoring section 204 transmits the data of the packet to an upper node on the DAT. The packet data is transmitted until arriving at the collector node. The processing is completed if arriving at the collector node.

An operation will be described by using FIG. 13 in which the back tracking process is added to FIG. 7A showing the processing flow of the first exemplary embodiment.

It should be noted that the back tracking process can be added to the second exemplary embodiment in the same way.

(1) Step S51

When the operator issues a back tracking instruction to the collector node, the collector node confirms a lower node on the DAT through which the event is passes.

(2) Step S52

The collector node notifies to each of the concerned nodes on the DAT.

(3) Step S53

Each node receiving the notice from the collector node confirms whether or not its own node is a probe node.

(4) Step S54

When its own node is not the probe node, each node confirms a further lower node on the DAT through which the event is passed.

(5) Step S55

The node notifies to the confirmed node on the DAT. The node repeats this process until arriving at the probe node.

(6) Step S56

When its own node is the probe node, the node searches the data of the packet related to the event.

(7) Step S57

Subsequently, the node which is the probe node transmits the data of the packet to the upper nodes on the DAT. That is, the processing of the transmission of the packet data is carried out in a direction opposite to a direction of the processing of the notice at steps S52 to S55.

(8) Step S58

The node which is the probe node transmits the packet data until arriving at the collector node, and the processing is completed when arriving at the collector node. In this example, the node receiving the packet data from the node which is the probe node, confirms whether or not its own node is the collector node. When its own node is not the collector node, the node confirms a further upper node on the DAT through which the event is passed. The node transmits the packet data to the confirmed node on the DAT. The node repeats the above processing until arriving at the collector node.

Through the above steps, the operator can know the probe node which detects the event, and acquire the data related to the event.

Lastly, referring to FIG. 14, an example of the hardware configuration to realize the distribution monitoring system in each exemplary embodiment of the present invention will be described. Here, as an example of each monitoring node 51-*i*, a computer is assumed. In this case, the detecting node 120 and the processing node 220 shown in FIG. 9 are independent computers in the second exemplary embodiment, respectively. That is, each of the detecting node 120 and the processing node 220 in the second exemplary embodiment has the same hardware configuration as the monitoring node 51-*i*.

The hardware configuration of the distribution monitoring system according to the exemplary embodiments of the present invention is changed based on an acquisition route of the program. When the program is acquired from a storage medium (media) by the computer, the hardware configuration of the distribution monitoring system contains a storage medium 1000 and a computer 2000. When the program is acquired through a network by the computer, the hardware configuration of the distribution monitoring system contains a computer 2000 and an external storage unit 3000. It should be noted that the hardware configuration of the distribution monitoring system may contain the storage medium 1000, the computer 2000 and the external storage unit 3000.

The storage medium 1000 stores the computer-readable program 1500 such that the computer functions as the monitoring node 51-*i*. As an example of the storage medium 1000, a DVD (Digital Versatile Disk), a USB memory (Universal Serial Bus memory), an SD card (Secure Digital memory card) or another memory card and so on are exemplified. It should be noted that the storage medium 1000 may be an electronic system which is connected with the computer through the USB cable and so on. Because it is the same essentially, actually, the preset invention is not limited to the example.

The computer 2000 is an electronic system which functions as the monitoring node 51-*i* by executing a program 1500. As an example of the computer 2000, computers such as a PC (personal computer), a thin client terminal/server, a work station, a mainframe, a supercomputer, a game machine for home, an Interactive TV, a digital recorder, data home electronics (data home appliance), a POS (Point of Sale) terminal, an OA (Office Automation) equipment Equal are exemplified. The computer 2000 may be installed onto a moving body such as a vehicle, a ship, and an aircraft. But, actually, the present invention is not limited to these examples.

The computer 2000 is provided with a processing unit 2001, a main memory unit 2002, a secondary storage unit 2003, a network interface 2004 and a storage medium inserting mouth 2005. In this example, the processing unit 2001, the main memory unit 2002, the secondary storage unit 2003, the network interface 2004 and the storage medium inserting mouth 2005 are supposed to be connected with the data bus. It should be noted that although not shown, the computer 2000 may be provided with an input unit and a display and so on.

The processing unit 2001 reads the program 1500 and executes the program 1500. As an example of the processing unit 2001, a CPU (Central Processing Unit), a microprocessor, a microcontroller, a semiconductor integrated circuit (Integrated Circuit (IC)) and a device which has a similar function are exemplified. But, the present invention is not limited to these examples.

When the processing unit 2001 executes the program 1500, the main memory unit 2002 stores the program 1500 and data during the processing temporarily. As an example of the main memory unit 2002, a RAM (random access memory), a ROM (read only memory), an EEPROM (electrically erasable and programmable read only memory), a flash memory, and these combinations are exemplified. But, actually, the present invention is not limited to these examples.

The secondary storage unit 2003 stores the program 1500 and provides the program 1500 to the processing unit 2001. In this example, the secondary storage unit 2003 stores the program 1500 and data used for the processing and data of a processing result. It should be noted that when the processing unit 2001 loads the program 1500 directly from the storage medium 1000, stores the program 1500 temporarily in the main memory unit 2002 and uses it, the secondary storage unit 2003 does not have to store the program 1500. As an example of the secondary storage unit 2003, a HDD (Hard Disk Drive) and an SSD (Solid State Drive), and so on are exemplified. The secondary storage 2003 does not have to be built in the computer 2000. For example, the secondary storage 2003 may be a peripheral device (external HDD, and so on). But, actually, the present invention is not limited to these examples.

The network interface 2004 is used to communicate with the computer 2000 and an external unit through the network. As an example of the network interface 2004, communication ports such as a network adapter of NIC (Network Interface Card) and so on, and a communication system, an end connection (connector) such as an antenna and so on are exemplified. Also, as an example of the network, the Internet, a LAN (Local Area Network), a wireless LAN (Wireless LAN), a backbone (Backbone), a community antenna television system (CATV) circuit, a fixation telephone network, a mobile phone network, a leased circuit (lease line), IrDA (Infrared Data Association), Bluetooth (registered trademark), a serial communication circuit and so on are exemplified. But, the present invention is not limited to these examples.

The storage medium inserting mouth 2005 is an inserting mouth to insert the storage medium by arranging the storage medium. Here, when the storage medium 1000 is arranged, the storage medium inserting mouth 2005 reads the program 1500 stored in storage medium 1000. As an example at th storage medium inserting mouth 2005, a DVD drive unit (the DVD drive), a USB port, an SD memory card slot, an end connections (connectors) which insert various cables of all kinds based on the standard other than the USB are exemplified. But, actually, the present invention is not limited to these examples.

The external storage unit 3000 stores the computer-read program 1500 such that a computer can function as the monitoring node 51-i. As an example of the external storage unit 3000, an external server (a Web server, a file server and so on), a DAS (Direct Attached Storage), an FC-SAN (Fibre Channel-Storage Area Network), a NAS (Network Attached Storage) IP-SAN (IP-Storage Area Network), and so on are exemplified. It should be noted that the external storage unit 3000 may be another monitoring node 51-i and the server 53. But, the present invention is not limited to these examples.

In this example, the main signal system network interface section 101, the receiving section 102, the interface section 104, the management system network interface section 201, the receiving section 202, the transmitting section 205 and the interface section 206 correspond to the network interface 2004. Also, the detecting section 103, the DHT/DAT section 203 and the monitoring section 204 correspond to the processing unit 2001. The storage section 110 corresponds to the main memory unit 2002 and secondary storage unit 2003. That is, in the main memory unit 2002 and the secondary storage unit 2003, necessary ones of the rule table 111, the monitoring table 211, the node table 212, the monitoring result data buffer 213, the DAT buffer 214 and the back track table 501 are stored.

It should be noted that each of the processing unit 2001, the main memory unit 2002, the secondary storage unit 2003, the network interface 2004 and the storage medium inserting mouth 2005 may be an aggregation of the units of a same system. For example, the NICs which are different are used for the main signal system network interface section 101 and the management system network interface section 201 (and the interface section 104 and the interface section 206 in FIG. 9), respectively. In this case, an aggregation of the NICs is called the network interface 2004. Also, when the computer 2000 is a CPU of multiple cores, the multiple cores are called the processing unit 2001.

As described above, the exemplary embodiments of the present invention have been described in detail. Actually, the present invention is not limited to the above-mentioned exemplary embodiments. Various modifications which do not deviate from the present invention are contained in the present invention.

The present application claims priorities on convention based on Japanese Patent Application No. 2009-035942 filed on Feb. 18, 2009 and Japanese Patent application No. 2009-201300 filed on Sep. 1, 2009. The disclosures thereof are incorporated herein by reference.

The invention claimed is:

1. A network distribution monitoring method for a monitoring object network which comprises a plurality of nodes which configures a management network, said network distribution monitoring method comprising:
generating a first detection message by detecting a first traffic on said monitoring object network by a corresponding one of a plurality of first applications which are predetermined, in each of first probe nodes of said plurality of nodes;
determining a first hash value to only a first function identifier showing a kind of said corresponding first application or said first function identifier and address data of said first traffic;
transmitting said first detection message to any of (i) a node which is determined from said first hash value and a first DAT (Distributed Aggregation Tree) of said first traffic, (ii) a node which is predetermined with respect to said first hash value and said management network, and (iii) a node which is dynamically determined with respect to said first hash value and said management network;
generating a first mediation processing result by performing first mediation processing on said first detection message to said plurality of first applications, in a first mediation node of said plurality of nodes; and
storing said first mediation processing result in a first collector node of said plurality of nodes.

2. The network distribution monitoring method according to claim 1, further comprising:
determining a node ID of said first collector node from said first hash value when transmitting said first detection message;
determining a transmission destination node from the node ID of said first collector node and said first DAT; and inserting the node ID of said first collector node in said first detection message.

3. The network distribution monitoring method according to claim 2, further comprising:
transmitting a first processing result message which includes said first mediation processing result, to a node which is determined based on the node ID of said first collector node, which is included in said first detection message, and a DAT which said first mediation node has; and
storing a processing result of said first processing result message which is received from said first mediation node, in case of storing said first mediation processing result.

4. The network distribution monitoring method according to claim 1, wherein said first mediation node is identical with said first collector node.

5. The network distribution monitoring method according to claim 1, further comprising:
generating a second detection message by detecting a second traffic on said object network of a corresponding one of a plurality of second applications which are predetermined, in each of second probe nodes of said plurality of nodes;
determining a second hash value corresponding to only a second function identifier showing a kind of said corresponding second application or said second function identifier and address data of said second traffic;
transmitting said second detection message to a node which is determined from said second hash value and a second DAT of said management network;
generating a second mediation processing result by performing second mediation processing on said second detection message to said plurality of second predetermined applications, in a second mediation node of said plurality of nodes; and
storing said second mediation processing result in a second collector node of said plurality of nodes.

6. The network distribution monitoring method according to claim 5, further comprising:
determining a node ID of said second collector node from said second hash value when transmitting said second detection message;
determining a transmission destination node from the node ID of said second collector node and said second DAT; and
inserting the node ID of said second collector node in said second detection message.

7. The network distribution monitoring method according to claim 6, further comprising:
transmitting a second processing result message which includes said second mediation processing result, to a node which is determined based on the node ID of said second collector node, which is contained in said second detection message, and DAT which said second mediation node has; and
storing a processing result of said second processing result message which is received from said second mediation node, in case of storing said second mediation processing result.

8. The network distribution monitoring method according to claim 5, wherein said second collector node is identical with said first collector node.

9. The network distribution monitoring method according to claim 5, further comprising:
sharing said management network by said plurality of first applications and said plurality of second applications; and
monitoring said plurality of first applications and said plurality of second applications through said management network.

10. The network distribution monitoring method according to claim 1, further comprising:
determining said plurality of first applications previously based on data of a filtering condition.

11. The network distribution monitoring method according to claim 1, wherein the address data of said first traffic on said monitoring object network includes at least one of a transmission source IP address, a transmission destination IP address, a transmission source URI and a transmission destinations URI in said first traffic.

12. The network distribution monitoring method according to claim 1, further comprising:
configuring a network by using DHT/DAT (Distributed Hash Table/Distributed Aggregation Tree);
determining a collector node based on a hash value; and
supporting different monitoring applications in the network which is scalable and fault tolerant.

13. The network distribution monitoring method according to claim 1, further comprising:
determining said first hash value by the hash function; and
dynamically controlling scalability by selecting said first mediation processing and an input of said hash function.

14. The network distribution monitoring method according to claim 1, further comprising:
giving said first collector node of said plurality of nodes, a function of inquiring detailed data to all said probe nodes which captured a packet related to an event by tracing ones of said plurality of nodes on the DAT.

15. The network distribution monitoring method according to claim 14, further comprising:
giving all said probe nodes which captured the packet related to the event, a function of transmitting the detailed data to said first collector node of said plurality of nodes, by tracing the nodes on the DAT.

16. The network distribution monitoring method according to claim 14, further comprising:
giving each of said plurality of nodes data of a kind of the event, a node ID of a lower node, a count of the event, a time of first reception of the event, a time of last reception of the event.

17. A non-transitory computer-readable storage medium which stores a computer-executable program code for each of a plurality of nodes to attain a monitoring method for a monitoring object network, which comprises said plurality of nodes which configures a management network, wherein said monitoring method comprises:
generating a detection message by detecting a traffic on said monitoring object network by a corresponding one of a plurality of applications, when said node functions as a probe node;
determining a hash value to only a function identifier showing a kind of said corresponding application or said function identifier and address data of said traffic; and
transmitting the detection message to any of (i) a node which is determined from said hash value and a DAT of said traffic of said management network, (ii) a node which is predetermined with respect to said hash value and said management network, and (iii) a node which is dynamically determined with respect to said hash value and said management network.

18. The non-transitory computer-readable storage medium according to claim 17, wherein said address data contains at least of a transmission source IP address, a transmission destination IP address, a transmission source URI and a transmission destination URI in said traffic.

19. The non-transitory computer-readable storage medium according to claim 17, wherein said monitoring method further comprises:
determining a node ID of a collector node from said hash value in case of transmitting said detection message;
determining a transmission destination node from the node ID of said collector node and said DAT; and
inserting the node ID of said collector node in said detection message.

20. The non-transitory computer-readable storage medium according to claim 19, wherein said monitoring method further comprises:
generating a mediation processing result by performing mediation processing on said detection message for each of said plurality of applications when said node functions as a mediation node.

21. The non-transitory computer-readable storage medium according to claim 20, wherein said monitoring method further comprises:
storing said mediation processing result when said node functions as said mediation node.

22. The non-transitory computer-readable storage medium according to claim 21, wherein said monitoring method further comprises:
receiving a processing result message which contains said mediation processing result, by a node determined based on the node ID of said collector node contained in said detection message and DAT which said mediation node has; and
storing said mediation processing result of said processing result message.

23. The non-transitory computer-readable storage medium according to claim 17, wherein said monitoring method further comprises:
configuring said management network with DHT/DAT;
determining a collector node based on a hash value; and
supporting a different monitoring application in said management network which is scalable and fault tolerant.

24. The non-transitory computer-readable storage medium according to claim 17 wherein said monitoring method further comprises:
determining said hash value from a hash function; and
dynamically controlling scalability by selecting said mediation processing and an input of said hash function.

25. The non-transitory computer-readable storage medium according to claim 17, wherein said monitoring method further comprises:
determining said plurality of applications previously based on data of a filtering condition.

26. The non-transitory computer-readable storage medium according to claim 17 wherein said monitoring method further comprises:
sharing said management network by said plurality of applications and a plurality of other applications; and
monitoring said plurality of applications and said plurality of other applications through said management network.

27. The non-transitory computer-readable storage medium according to claim 17, wherein said monitoring method further comprises:
inquiring detailed data to all probe nodes which captured a packet related to an event, when said node functions as said collector node.

28. The non-transitory computer-readable storage medium according to claim 27, wherein said monitoring method further comprises:
transmitting the detailed data to said collector node of said plurality of nodes, by tracing said plurality of nodes on the DAT, when said node functions as said probe node which captured the packet related to the event.

29. The non-transitory computer-readable storage medium according to claim 27, wherein said monitoring method further comprises:
giving each of said plurality of nodes data of a kind of the event, a node ID of a lower node, a count of the event, a time of first reception of the event, and a time of last reception of the event.

30. A network distribution monitoring system comprising:
a management network; and
a plurality of nodes connected with a monitoring object network and configuring said management network,
wherein said plurality of nodes comprises:
a probe node configured to generate a detection message by detecting a traffic on said monitoring object network by a corresponding one of a plurality of applications which are predetermined, to determine a hash value to only a function identifier showing a kind of the corresponding application or address data of said traffic and the function identifier, and to transmit said detection message to any of (i) a node which is determined from said hash value and the DAT for said traffic, (ii) a node which is predetermined with respect to said hash value and said management network and (iii) a node which is dynamically determined with respect to said hash value and said management network;
a mediation node configured to generate a mediation processing result by performing mediation processing on said detection message to said plurality of applications; and
a collector node configured to store said mediation processing result.

31. The network distribution monitoring system according to claim 30, wherein said address data comprises at least one of a transmission source IP address, a transmission destination IP address, a transmission source URI and a transmission destinations URI in said traffic.

32. The network distribution monitoring system according to claim 30, wherein said probe node determines a node ID of said collector node from said hash value, and determines a transmission destination node from the node ID of said collector node and said DAT, and
wherein said detection message contains the node ID of said collector node.

33. The network distribution monitoring system according to claim 32, wherein said mediation node transmits a processing result message which contains said mediation processing result to a node which is determined based on the node ID of said collector node contained in said detection message and the DAT which said mediation node has, and
wherein said collector node stores said mediation processing result of said processing result message which is received from said mediation node.

34. The network distribution monitoring system according to claim 30, wherein said mediation node is identical with said collector node.

35. The network distribution monitoring system according to claim 30, wherein said probe node comprises:

a detecting node configured to detect the traffic on said monitoring object network by the corresponding application of the plurality of applications to generate the detection message; and a processing node configured to transmit said detection message to any of (i) a node which is determined based on only a function identifier indicating a kind of the corresponding application, (ii) a node which is determined based on said hash value of the function identifier and address data of said traffic, and (iii) a node which is the DAT of said traffic of said management network.

36. The network distribution monitoring system according to claim 30, wherein each of said plurality of nodes supports a different monitoring application in said management network which is a scalable and is a fault tolerant.

37. The network distribution monitoring system according to claim 30, wherein said hash value is determined based on a hash function, wherein each of said mediation nodes dynamically controls scalability by selecting an input of the hash function and said mediation processing.

38. The network distribution monitoring system according to claim 30, wherein each of said probe nodes predetermines the plurality of applications based on data of a filtering condition.

39. The network distribution monitoring system according to claim 30, wherein said plurality of applications and a plurality of other applications share said management network, and wherein each of said probe nodes monitors said plurality of applications and said plurality of other applications through said management network.

40. The network distribution monitoring system according to claim 30, wherein said collector node has a function of inquiring detailed data to all said probe nodes which captured a packet related with an event by tracing said plurality of nodes on the DAT.

41. The network distribution monitoring system according to claim 40, wherein all said probe nodes which captured the packet related with the event have a function of transmitting the detailed data to said collector node of said plurality of nodes by tracing the nodes on the DAT.

42. The network distribution monitoring system according to claim 40, wherein each node has data of a kind of the event, a lower node ID, a count of the event, a time of first reception of the event, and a time of last reception of the event.

* * * * *